United States Patent [19]

Jones et al.

[11] 3,754,309
[45] Aug. 28, 1973

[54] CUTTING INSERT AND CLAMPING ARRANGEMENT THEREFOR

[75] Inventors: Dennis G. Jones, George G. Barkley, both of Greensburg, Pa.

[73] Assignee: Kennametal Inc., Latrobe, Pa.

[22] Filed: Jan. 28, 1972

[21] Appl. No.: 221,765

Related U.S. Application Data

[63] Continuation of Ser. No. 74,649, Sept. 23, 1970, abandoned.

[52] U.S. Cl. .................................. 29/96 R, 29/95 R
[51] Int. Cl. .............................................. B26d 1/00
[58] Field of Search ............................. 29/95, 96, 97

[56] References Cited
UNITED STATES PATENTS

| 1,396,180 | 11/1921 | Fors | 29/96 |
| 3,490,117 | 1/1970 | Hertel | 29/96 |
| 3,084,416 | 4/1963 | Broughton | 29/96 |

FOREIGN PATENTS OR APPLICATIONS

| 1,246,360 | 8/1967 | Germany | 29/96 |
| 552,382 | 4/1943 | Great Britain | 29/96 |

Primary Examiner—Harrison L. Hinson
Attorney—Melvin A. Crosby

[57] ABSTRACT

The specification discloses a cutting insert which is invertable and which has a diagonal notch in each of the top and bottom sides thereof which is engaged by a clamp element which presses the insert downwardly into a pocket provided therefor in a holder while simultaneously drawing the insert against the sides of the pocket.

11 Claims, 16 Drawing Figures

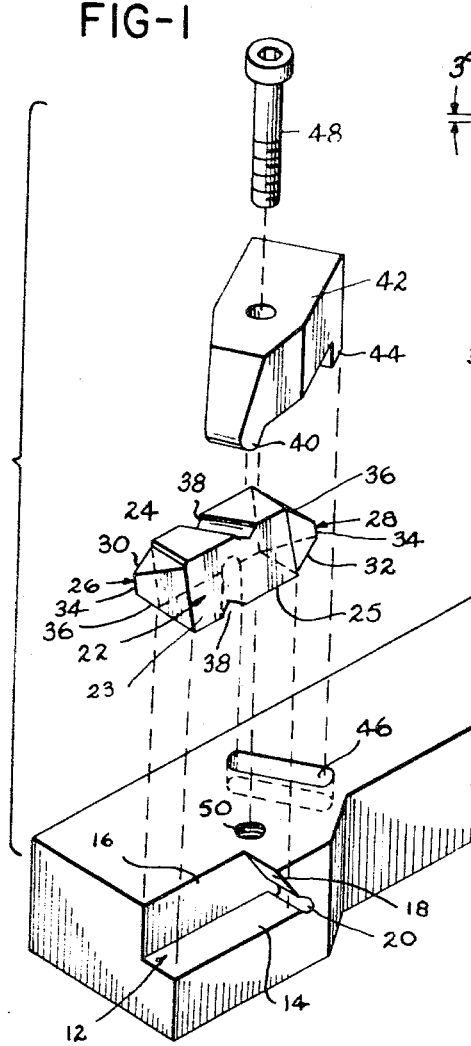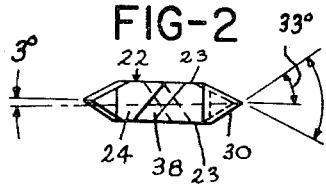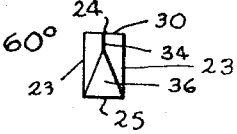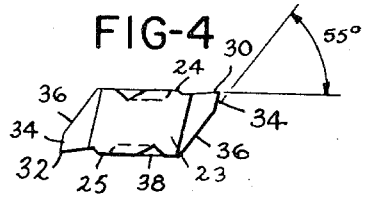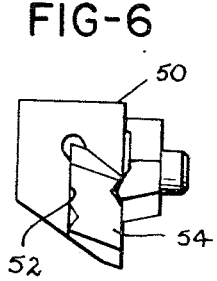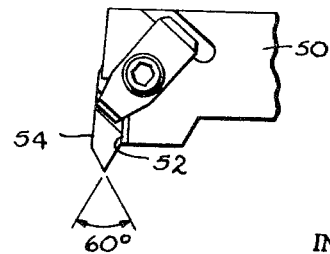

Patented Aug. 28, 1973

INVENTOR.
DENNIS G. JONES
BY GEORGE G. BARKLEY

Melvin A. Cahly

CUTTING INSERT AND CLAMPING ARRANGEMENT THEREFOR

This application is a continuation of U.S. Pat. application Ser. No. 74,649, filed Sept. 23, 1970, now abandoned.

This invention relates to cutting inserts, especailly for metal cutting, and to a holder and clamp arrangement therefor.

Cutting inserts are well known, and quite a large percentage thereof are of the throw away type, which are those inserts which are detachably clamped on a holder and which are discarded when they become dull or chipped. Throw away inserts are usually indexable and are sometimes also reversible and sometimes are merely reversible so that an insert can be provided with at least two cutting edges for selective presentation to the cutting position.

The provision of two or more cutting edges on the insert makes it economical to use and is particularly important in respect of throw away inserts because of the high cost of the inserts, especially when made from a material such as a cemented metal carbide.

The throw away inserts must, however, be accurately mounted in the pocket provided therefor in a holder, especially when the inserts are employed with numerically controlled machines which depend for accuracy upon an accurately located and firmly supported insert.

When the inserts are of substantial area, it is possible accurately and firmly to fix the inserts in a pocket in a holder by providing the insert with a central hole and making the holder with a pin type clamping device therein. In other cases, such inserts may be held in place by a top clamp, usually with a chip breaking member interposed between the clamp and the insert.

For grooving and cut off and threading operations, and the like, however, the insert is mounted in the holder pocket setting up on edge and there is not sufficient material to permit a hole to be placed in the insert for a pin type clamp. Under these circumstances, it is necessary to resort to a top clamp to hold the insert in place. It is in particular connection with a grooving or threading or cut off insert and a holder and clamp therefor that the present invention is concerned.

A particular object of the invention is the provision of an arrangement for firmly holding an insert in a pocket when the insert is setting up on edge in the pocket.

Another object is the provision of an arrangement for accurately locating an insert when it sits edgewise in a pocket provided therefor.

It is also an object to provide an insert configured to cooperate with a clamping element to hold the insert setting on edge in a pocket on a holder so that the insert is not only fixedly clamped in the pocket but is also held firmly against the sides of the pocket and thereby accurately located in the holder.

These and other objects and advantages of the present invention will become more apparent upon reference to the following detailed specification taken in connection with the accompanying drawings in which:

FIG. 1 is an exploded perspective view showing a typical holder and insert and clamping arrangement according to the present invention;

FIG. 2 is a plan view of the insert of FIG. 1 showing certain important angles formed on the insert;

FIG. 3 is an end view of the insert of FIG. 2;

FIG. 4 is a side view of the insert;

FIG. 5 is a plan view showing an end of a holder having a pocket with an insert mounted therein and with the insert extending laterally from the holder;

FIG. 6 is an end view of the holder of FIG. 5;

BRIEF SUMMARY OF THE INVENTION

Figure 7:
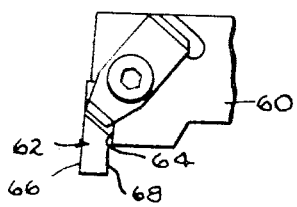
FIG. 7 is a fragmentary plan view similar to FIG. 5 showing another type of insert.

According to the present invention, an insert is formed which is adapted to rest edgewise in the pocket of a holder. The insert has cutting edges formed at respectively opposite ends of the top and bottom of the insert and the end walls of the insert are inclined backwardly away from the cutting edges.

The insert is adapted for being invertably mounted in a pocket in a holder and is held in place in the holder by a top clamp which is generally in the form of an inverted "U" shaped member having the end of one leg engaging a recess in the holder and the end of the other leg engaging a notch in the insert.

The clamp member extends angularly to the length of the insert and when engaged with the notch in the insert pulls the insert tightly against the back and side walls of the pocket provided therefor in the holder while simultaneously pressing the insert solidly against the bottom wall of the holder.

As mentioned, the insert is invertable and has a notch diagonally formed in each of the top and bottom sides thereof for cooperation with the clamp member.

DETAILED DESCRIPTION

Referring to the drawings somewhat more in detail, FIG. 1 shows a typical holder which is in the form of a bar-like steel member 10 adapted for being clamped in a tool support of any suitable type. At one end of member 10 there is an insert pocket 12 having a bottom wall 14 and a side wall 16 and a back wall 18.

Advantageously, an undercut is provided at the juncture of the bottom and back walls as indicated at 20 to protect the cutting edge of the insert which is disposed in that region in each clamped position of the insert.

It will be noted that bottom and side walls, 14 and 16, of the pocket, are at right angles to each other whereas back wall 18 may be at right angles to side wall 16 but converges with bottom wall 18 in the direction toward the back of the pocket.

The pocket 12 is adapted for receiving an insert 22 which is preferably a hard cemented carbide such as tungsten or titanium carbide or tungsten titanium carbide and is formed substantially to fit in pocket 12. To this end the insert 22 has parallel front and back faces 23, top and bottom walls 24 and 25, which are parallel to each other, and opposite end parts 26 and 28. At the juncture of end part 26 and top wall 24 is one cutting edge 30 and at the juncture of the other end part 28 and the bottom wall 25 of the insert is another cutting edge 32.

Immediately beneath each cutting edge the respective end part of the insert inclines backwardly as at 34 while the remaining portion of the respective end part of the insert inclines backwardly at a considerably greater angle of inclination, as at 36. The angle of inclination of the portions 36 of the ends of the insert is the same as the angle of wall 18 of the pocket so that when the insert is mounted in the pocket it will have a good bearing on the bottom, side, and back walls of the pocket.

According to the present invention, the insert is formed with a diagonal groove 38 in each of the top and bottom walls of the insert; each groove preferably being "V" shaped in cross section and adapted for engagement by the rounded nose 40 on the end of one leg of a clamp member 42 which is in the form of an inverted "U" shaped manner.

Clamping member 42 has a further leg 44 adapted for being received in a recess 46 formed in the top of holder 10. A clamp screw 48 extends through a hole in clamp member 42 between the legs thereof and into a threaded hole 50 provided in the top wall of the holder.

When the insert is placed in the pocket, the clamp member is put in position, and screw 48 is tightened up, and the insert is pressed firmly against bottom wall 14 of the pocket while simultaneously being drawn toward walls 16 and 18. The insert is thus fixedly clamped in the pocket in the holder and is accurately located therein by being forced against the walls of the pocket.

The side walls 16 of the pocket is preferably at a slight angle, say, about 3°, to the longitudinal axis of holder 10. For this reason the opposite ends of the insert are shaped in such a manner as to compensate for the small angularity of wall 16 to the longitudinal axis of holder 10.

As will be seen in FIG. 3, there is an angle of about 3° between the longitudinal axis of the insert and the axis of symmetry of the end parts of the insert. In FIG. 2, the end parts are formed at an angle of 60° so the insert can be used for standard threading operations and it will be appreciated that in either inverted position of the insert, the axis of symmetry of the cutting edge presented for operating a workpiece will be parallel with the longitudinal axis of holder 10.

FIG. 4 will show that the sharply inclined portion 36 of each end part of the insert is the angle of about 55° from a plan parallel to the top and bottom walls of the insert.

The insert in FIG. 1 is presented endwise from holder 10 whereas in FIGS. 5 and 6 the holder 50 illustrated therein is provided with a pocket 52 formed in the end thereof which receives an insert 54 having a cutting edge which is presented laterally of the longitudinal axis of the holder.

As before, the side wall of the pocket is formed to a slight angle from the perpendicular to the longitudinal axis of the holder and the end parts of the insert are so formed that when the insert is mounted in the pocket, the end presented for cutting operations is symmetrical about an axis perpendicular to the longitudinal axis of the holder.

FIG. 7 shows a holder 60 similar to the holder of FIG. 5 and having an insert 62 mounted in the pocket 64 which is adapted for grooving operations or for cutting square threads. It will be noted that the insert 62 is formed flat on one side, as indicated at 66 and has relief formed on the other side adjacent the ends as at 68.

Figure 8:
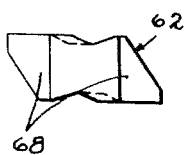
FIG. 8 is a side view of the insert of FIG. 7.
Figure 9:
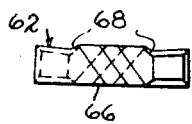
FIG. 9 is a plan view of the insert of FIGS. 7 and 8.

By slightly inclining the side wall of the pocket, as has been referred to hereinbefore, the insert can be formed with the one side flat as at 66 and ample clearance will be maintained between the insert and the workpiece backwardly from the cutting edge and side clearance in the front to back direction will have to be provided on the insert on only the one side as at 68. Clearance in the up and down direction will, of course, be provided on both sides of the insert. This simplifies the operation of making the insert and keeps the cost thereof lower than would otherwise be the case. The insert of FIG. 7 is shown in side and plan views in FIGS. 8 and 9 respectively.

Figure 10:
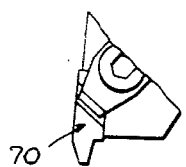
FIG. 10 is a fragmentary plan view similar to FIGS. 5 and 7 but showing a different type of insert.
Figure 11:
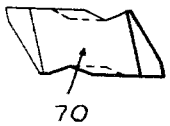
FIG. 11 is a side view of the insert of FIG. 10.
Figure 12:
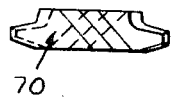
FIG. 12 is a plan view of the insert of FIG. 10.

FIGS. 10, 11 and 12 disclose another type of insert 70 which is configured on the ends for forming an Acme thread or the like.

Figure 13:
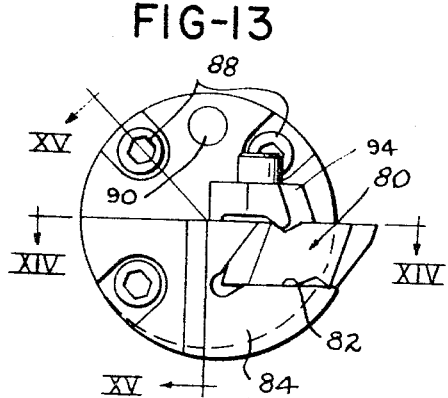
FIG. 13 is an end view showing an arrangement for mounting an insert according to the present invention on a head adapted to be mounted on a boring bar.
Figure 14:
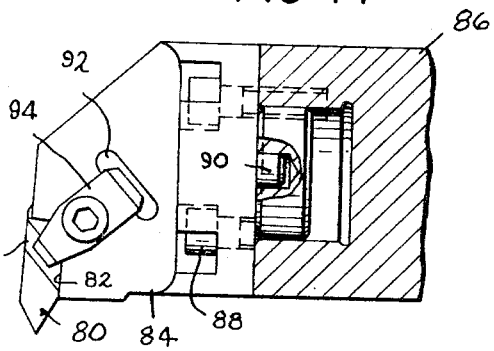
FIG. 14 is a view substantially indicated by line XIV–XIV on FIG. 13.
Figure 15:
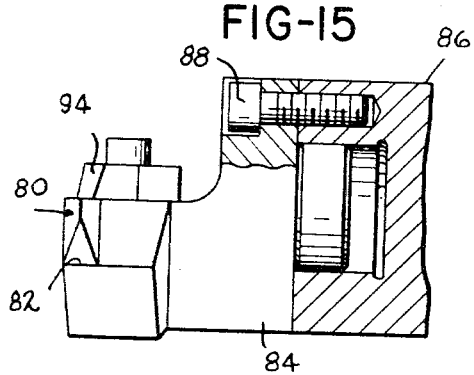
FIG. 15 is another sectional view indicated substantially by the line XV—XV on FIG. 13.

FIGS. 13 to 15 show an insert 80 substantially like that shown in FIGS. 1 to 5 but the insert is mounted in a pocket 82 formed in a head 84 secured to the end of a boring bar 86 as by cap screws 88 and angularly located on the boring bar by dowel pin means 90.

The steel head, the same as the holders previously referred to, is formed with a recess 92 for receiving one leg of an inverted "U" shaped clamping member 94 which has the other leg engaging a diagonal "V" shaped notch 96 provided in the uppermost wall of the insert mounted in the pocket.

Figure 16:
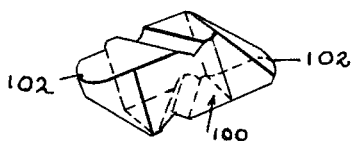
FIG. 16 is a perspective view showing still another type of insert.

FIG. 16 shows in perspective an insert 100 substantially the same as those previously described except having rounded cutting edges as at 102.

In all of the modifications described, the insert is invertable about an axis perpendicular to the side walls thereof and has a cutting edge at one end of the top wall and at the opposite end of the bottom wall. Each insert is receivable in a form fitting pocket provided therefor in a holder and is firmly pressed against the three sides of the pocket by a top clamp arrangement which positively engages both the holder and the insert.

What is claimed is:

1. In a cutting tool: holder means having an insert pocket formed therein which has one end wall means and one side wall means and a bottom wall means and is open on the said other three sides, said holder means having a longitudinal mounting axis, a hard insert receivable in said pocket and having end regions and parallel sides and parallel top and bottom walls perpendicular to said sides, said insert when seated in said pocket having one of said top and bottom walls resting on said bottom wall means and one side engaging said side wall means and one end region engaging the said end wall means, said insert being invertable in said pocket about an axis perpendicular to the said sides thereof, said insert having cutting regions at the junctures of said top and bottom walls and respective ones of said end regions and when seated in said pocket projecting from the open end thereof to expose the one of said cutting regions which is then uppermost in said pocket, each said end region being inclined to form an acute included angle with that one of said top and bottom walls with which the respective end region forms a cutting region, means forming a diagonal notch in each of said top and bottom walls so inclined that each notch when uppermost forms an acute angle with said side wall means on the side of the notch which is nearest said end wall means, a recess in said holder means spaced from said uppermost notch in a direction substantially perpendicular to the length of thenotch, a clamp element having a pair of dependent legs with the extremity of one of said legs in each of aid notch and recess, and means on said holder means engaging said clamp element and adjustable for urging said clamp element toward said holder means for pressing said legs into said notch and recess for fixedly clamping said insert in said pocket.

2. A cutting tool according to claim 1 in which at least one of the sides of said uppermost notch and said recess nearest each other and the sides of said legs in engagement therewith are convergent upwardly whereby pressing of said legs into said uppermost notch and recess will draw said insert firmly against said side wall means and end wall means of said pocket while simultaneously clamping the insert solidly against said bottom wall means of the pocket.

3. A cutting tool according to claim 1 in which said holder means has an end portion and oppositely facing side portions adjacent to said end portion, said pocket being formed in one of said end and side portions, said bottom wall means of said pocket being disposed in a plane substantially parallel to said longitudinal mounting axis, said side wall means of said pocket being disposed in a plane which is perpendicular to the plane of said bottom wall means and which diverges from said longitudinal mounting axis toward the open end of said pocket at an acute included angle of about 3° to about 5°.

4. A cutting tool according to claim 1 in which said holder means has an end portion and oppositely facing side portions adjacent to said end portion, said pocket being formed in one of said end and side portions, said bottom wall means of said pocket being disposed in a plane substantially parallel to saidlongitudinal mounting axis, said side wall means of said pocket being disposed in a plane which is perpendicular to the plane of said bottom wall means and which diverges from a plane perpendicular to said longitudinal mounting axis in a direction toward the open end of said pocket at an included angle on the order of from about 3° to about 5°.

5. A cutting tool according to claim 3 in which said holder means comprises a radial flange adjacent said side and end portions and a cylindrical axial shank upstanding from the center of said flange on the side thereof opposite said end portion, the axis of said shank being parallel to said longitudinal mounting axis, said cylindrical shank being receivable in a bore in a support member, means for locating said holder means on said support memberangularly with respect to the axis of said cylindricalshank, and means for fixedly clamping said flange of said holder means to said support member.

6. A cutting tool according to claim 1 in which each cutting region when viewed in plan is symmetrical about an axis of symmetry extending generally longitudinally of the insert and parallel to the longitudinal mounting axis of said holder means when the insert is seated in said pocket with the respective cutting region uppermost.

7. A cutting insert having end wall regions and parallel sides and parallel top and bottom walls perpendicular to said sides and adapted for mounting in a pocket in a holder with one end region exposed, said insert being invertable about an axis perpendicular to the said sides thereof, said insert having cutting edges at the junctures of said top and bottom walls and respective ones of said end wall regions, whereby in each inverted position of the insert a respective cutting edge is presented uppermost at the same end of the insert, and a diagonal notch formed in each of said top and bottom walls of the insert and extending thereacross at an angle such that each notch when uppermost forms substantially the same acute angle with said sides of the insert, each end wall region of said insert forming an included angle of less than 90° with the one of said top and bottom walls with which the respective end wall region forms a cutting edge.

8. A cutting insert according to claim 7 in which each said notch is substantially "V" shaped in cross section.

9. A cutting insert according to claim 7 in which each said end wall region when viewed from the side of the insert comprises two portions in end to end relation at an angle to each other and to said top and bottom walls, the said portion adjacent the cutting edge pertaining to the respective end wall region forming an included acute angle on the order of from about 75° to 85° with the adjacent one of said top and bottom walls and the other said portion forming an acute angle on the order of from about 50° to 60° with the same said one of said top and bottom walls.

10. A cutting insert according to claim 7 in which each cutting edge when viewed in plan is symmetrical about a respective axis of symmetry extending substantially longitudinally of the insert and making the same small angle with a plane parallel to the sides of the insert, said axes of symmetry being convergent toward one side of said insert and divergent toward the other thereof.

11. A cutting insert according to claim 10 in which the smaller included angle between said axes of symmetry is on the order of about 6°.

* * * * *